(12) United States Patent
Ligtenberg et al.

(10) Patent No.: US 7,850,378 B1
(45) Date of Patent: Dec. 14, 2010

(54) WEBBED KEYBOARD ASSEMBLY

(75) Inventors: Chris Ligtenberg, San Carlos, CA (US); Bart Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/129,252

(22) Filed: May 13, 2005

(51) Int. Cl.
*B41J 5/00* (2006.01)
*G06F 3/023* (2006.01)

(52) U.S. Cl. ............ 400/490; 400/491; 400/493; 400/493.1; 400/495; 341/22

(58) Field of Classification Search ........ 400/490, 400/481, 491, 489, 486, 484, 493.1, 495; 341/22, 23, 20; 200/302.2, 302.1, 248, 287, 200/344; 361/679.13
See application file for complete search history.

(56) References Cited

U.S. PATENT DOCUMENTS

| | | | | |
|---|---|---|---|---|
| 3,676,607 A | * | 7/1972 | Nash et al. | 379/361 |
| 4,021,630 A | * | 5/1977 | Taylor | 200/512 |
| 4,524,249 A | * | 6/1985 | Farrell | 200/5 A |
| 4,524,429 A | | 6/1985 | Giebel | |
| 4,772,769 A | * | 9/1988 | Shumate | 200/314 |
| 5,129,747 A | * | 7/1992 | Hutchison | 400/489 |
| 5,193,669 A | * | 3/1993 | Demeo et al. | 200/512 |
| 5,677,826 A | * | 10/1997 | Sellers | 361/679.14 |
| 5,697,718 A | * | 12/1997 | Erler et al. | 400/714 |
| 5,710,397 A | * | 1/1998 | Liao | 200/5 A |
| 5,793,605 A | * | 8/1998 | Sellers | 361/679.13 |
| 5,951,178 A | * | 9/1999 | Lim | 400/472 |
| 6,156,986 A | * | 12/2000 | Tsai | 200/345 |
| 6,174,097 B1 | * | 1/2001 | Daniel | 400/472 |
| 6,216,988 B1 | * | 4/2001 | Hsu et al. | 248/118 |
| 6,887,001 B2 | * | 5/2005 | Kitamura et al. | 400/490 |
| 6,971,807 B2 | * | 12/2005 | Tsai et al. | 400/472 |
| 2003/0002901 A1 | * | 1/2003 | Sellers | 400/472 |

FOREIGN PATENT DOCUMENTS

EP 1280171 A2 * 1/2003

* cited by examiner

*Primary Examiner*—Daniel J Colilla
*Assistant Examiner*—Matthew G Marini
(74) *Attorney, Agent, or Firm*—Beyer Law Group LLP (57) ABSTRACT

A keyboard assembly configured for converting keystroke activation into electrical signals. The keyboard assembly includes a plurality of key caps, each of the plurality of key caps being configured to transition between a rest position and a depressed position. The keyboard assembly also includes a web-like structure having a plurality of interconnected ribs defining a plurality of apertures. The plurality of key caps are disposed such that the plurality of key caps move within the plurality of apertures and traverse a plane formed by an upper surface of the web-like structure when the plurality of key caps transition between the rest position and the depressed position.

16 Claims, 10 Drawing Sheets

WEBBED KEYBOARD ASSEMBLY

BACKGROUND OF THE INVENTION

Keyboards, along with computer pointing devices such as computer mice or trackballs, have long been employed as human-to-computer interface devices. A typical keyboard typically includes a plurality of sub-systems designed to convert keystrokes into electronic signals. In a typical laptop computer, for example, a typical keyboard module may include a plurality of key caps, a biasing arrangement for supporting the key caps in their rest position and during keystroke travel, some form of electrical contact circuitry, and other structures for stiffening the keyboard module as well as for fastening the keyboard module to the laptop computer framework.

Figure 1:
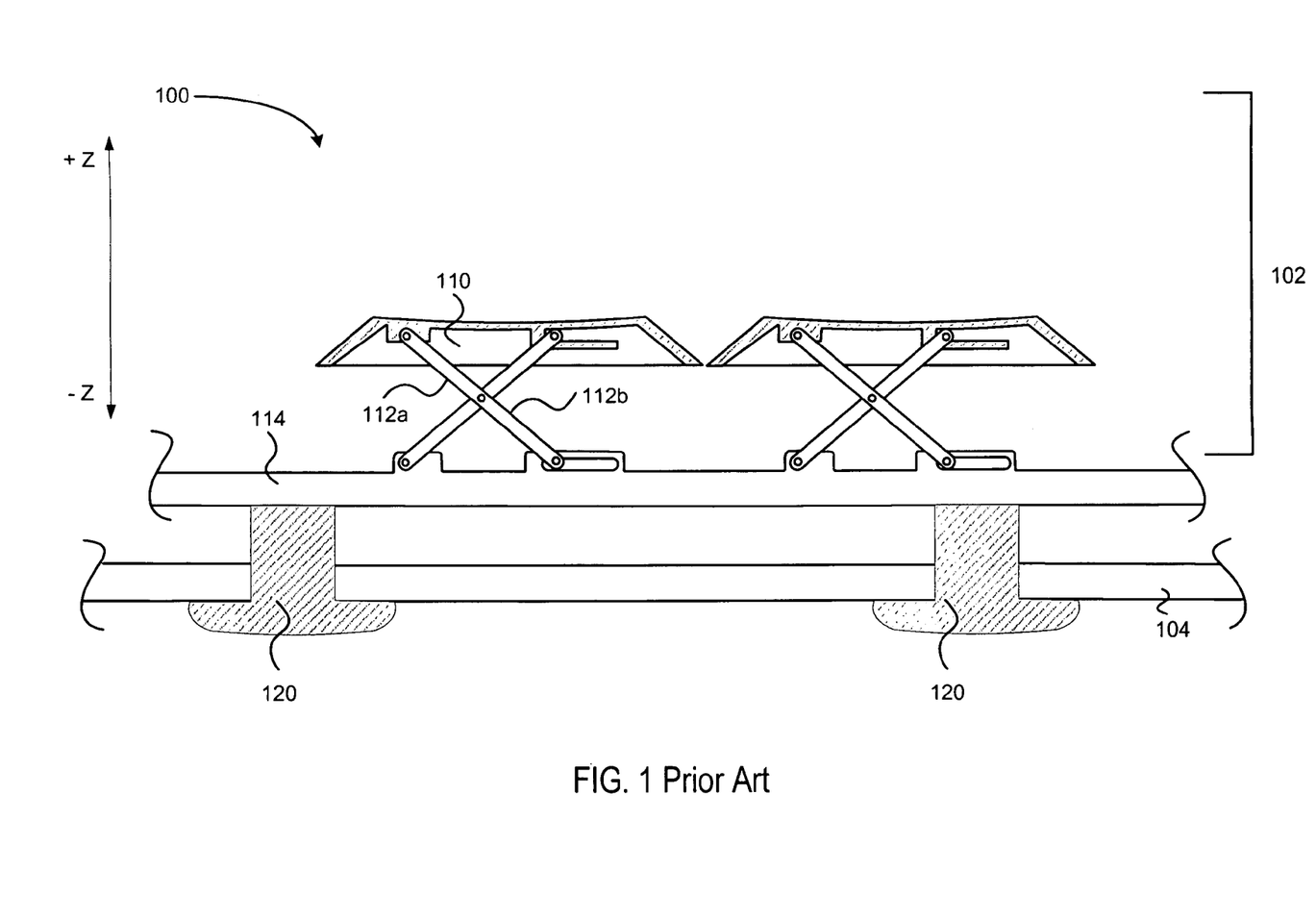
FIG. 1 is a prior art figure showing a portion of an example keyboard arrangement, including a keyboard module attached to a keyboard base plate of the laptop computer.

To facilitate discussion, FIG. 1 shows a portion of an example keyboard arrangement 100 including a keyboard module 102 attached to a keyboard base plate 104 of the laptop computer. The keyboard base plate 104 represents the mechanical structure of the laptop to which keyboard module 102 is attached. Keyboard module 102 includes a plurality of key caps, of which key cap 110 is representative. Key cap 110 is held in its elevated, rest position (relative to keyboard base plate 104) by a biasing arrangement that includes scissor linkages 112a and 112b. As can be seen in FIG. 1, one end of each scissor linkage couples with key cap 110, with the other end coupled with a keyboard mechanism plate 114. As such, linkages 112a and 112b also perform the function of keeping key cap 110 from being detached from the rest of keyboard module 102.

When key cap 110 is depressed, respective slots in the key cap and the keyboard mechanism plate allow scissor linkages 112a and 112b to simulate folding and unfolding actions, thereby enabling key cap 110 to move upward and downward in the Z direction without excessive wobbling. As key cap 110 travels downward, key cap 110 collapses a rubber or resilient dome (conventional and not shown). The collapsing action of the dome creates a characteristic tactile feel and/or force profile.

The downward movement of key cap 110 also causes key cap 110 to make contact with an electrical membrane (not shown), thereby completing the electrical connection that generates and sends a unique electrical signal representing the fact that key cap 110 has been depressed. As key cap 110 is released, the action of the aforementioned dome as well as of the scissor linkages pushes key cap 110 upward to its at-rest position. The details of prior art keyboard module 102 are conventional and will not be discussed in details herein for brevity's sake.

Keyboard module 102 is coupled to keyboard base plate 104 by a plurality of fasteners 120. Keyboard base plate 104 stiffens keyboard module 102 by lending its rigidity to keyboard module 102. This stiffening function is particularly important for a backlit keyboard module, which typically has a large percentage of the mechanism plate 114 removed to allow light to reach the key caps.

A certain keystroke travel distance by key cap 110 is required. With the right amount of keystroke travel, the keyboard user is provided with the appropriate tactile experience when the keys are depressed. For example, some keyboard designs call for a key cap travel distance of about 2.5 millimeters (mm). To accommodate this key cap travel distance, the total thickness in the Z direction of keyboard assembly, including keyboard module 102 and keyboard base plate 104, is typically about 6 mm. Factoring in the heads of fasteners 120, it is not unusual to require a vertical dimension of roughly 6.6 mm in the laptop to accommodate a keyboard assembly.

As devices such as laptop computers become smaller, thinner and more sophisticated, there is less room to incorporate a keyboard assembly into the electronic device. Accordingly, there exists a need for an improved keyboard assembly that is thinner, smaller, and/or incorporates innovative features not found in current keyboards. The present patent application is directed toward such an improved keyboard assembly.

SUMMARY OF THE INVENTION

The invention relates, in an embodiment, to a keyboard assembly configured for converting keystroke activation into electrical signals. The keyboard assembly includes a plurality of key caps, each of the plurality of key caps being configured to transition between a rest position and a depressed position. The keyboard assembly also includes a web-like structure having a plurality of interconnected ribs defining a plurality of apertures. The plurality of key caps are disposed such that the plurality of key caps move within the plurality of apertures and traverse a plane formed by an upper surface of the web-like structure when the plurality of key caps transition between the rest position and the depressed position.

In another embodiment, the invention relates to a keyboard assembly that includes a plurality of key caps. The plurality of key caps being configured to transition between a rest position and a depressed position. The keyboard assembly includes a mechanism plate disposed below the plurality of key caps. The plurality of key caps are coupled with the mechanism plate via movable means. The keyboard assembly further includes structural support means disposed in interstitial spaces among the plurality of key caps. The structural support means is coupled to the mechanism plate.

In yet another embodiment, the invention relates to a keyboard assembly coupled to an electronic device, the keyboard assembly being configured for converting keystroke activation into electrical signals. The keyboard assembly includes a plurality of key caps having at least a first key cap. The keyboard assembly also includes a mechanism plate disposed below the plurality of key caps. The keyboard assembly further includes a web-like structure having a plurality of interconnected ribs defining a plurality of apertures. The web-like structure is coupled to the mechanism plate. The plurality of key caps are disposed within the plurality of apertures.

These and other features and advantages of the invention will be discussed in more detail in the following detailed description of the invention and in conjunction with the following figures.

BRIEF DESCRIPTION OF THE DRAWINGS

The invention is illustrated by way of example, and not by way of limitation, in the figures accompanying the drawings, and in which like reference numerals refer to similar elements, and in which.

DETAILED DESCRIPTION OF THE PREFERRED EMBODIMENTS

The invention will now be described in detail with reference to a few preferred embodiments, as illustrated in the accompanying drawings. In the following description, numerous specific details are set forth in order to provide a thorough understanding of the invention. It will be apparent, however, to one skilled in the art, that the invention may be practiced without some or all of these specific details. In other instances, well-known process steps and/or features have not been described in detail in order to not unnecessarily obscure the invention. The features and advantages of the invention may be better understood with reference to the drawings and discussions that follow.

In an embodiment, the Z-stack dimension (i.e., the total thickness of the keyboard assembly) is advantageously reduced by employing a web-like structure whose interconnected ribs fit in the interstitial spaces between adjacent key caps in order to stiffen the keyboard assembly. Instead of relying on the thickness of the keyboard base plate (e.g., keyboard base plate 104 of FIG. 1) or ultra-stiff (and typically expensive) keyboard base plate material to provide the stiffness reinforcement function, embodiments of the invention provide the additional stiffening structure in the form of interconnected ribs of a web-like structure. The interconnected ribs are disposed in between adjacent key caps in such as way that they do not materially contribute to an increase in the Z-stack thickness and in fact contribute to a reduction in the Z-stack thickness.

In another embodiment, the key caps and the web-like structure are formed with innovative shapes to improve the keyboard's resistance to damage from liquid spillage. In another embodiment, the relative positioning of the key caps and/or the web-like structure serve to improve the keyboard's resistance to tampering.

Figure 2A:
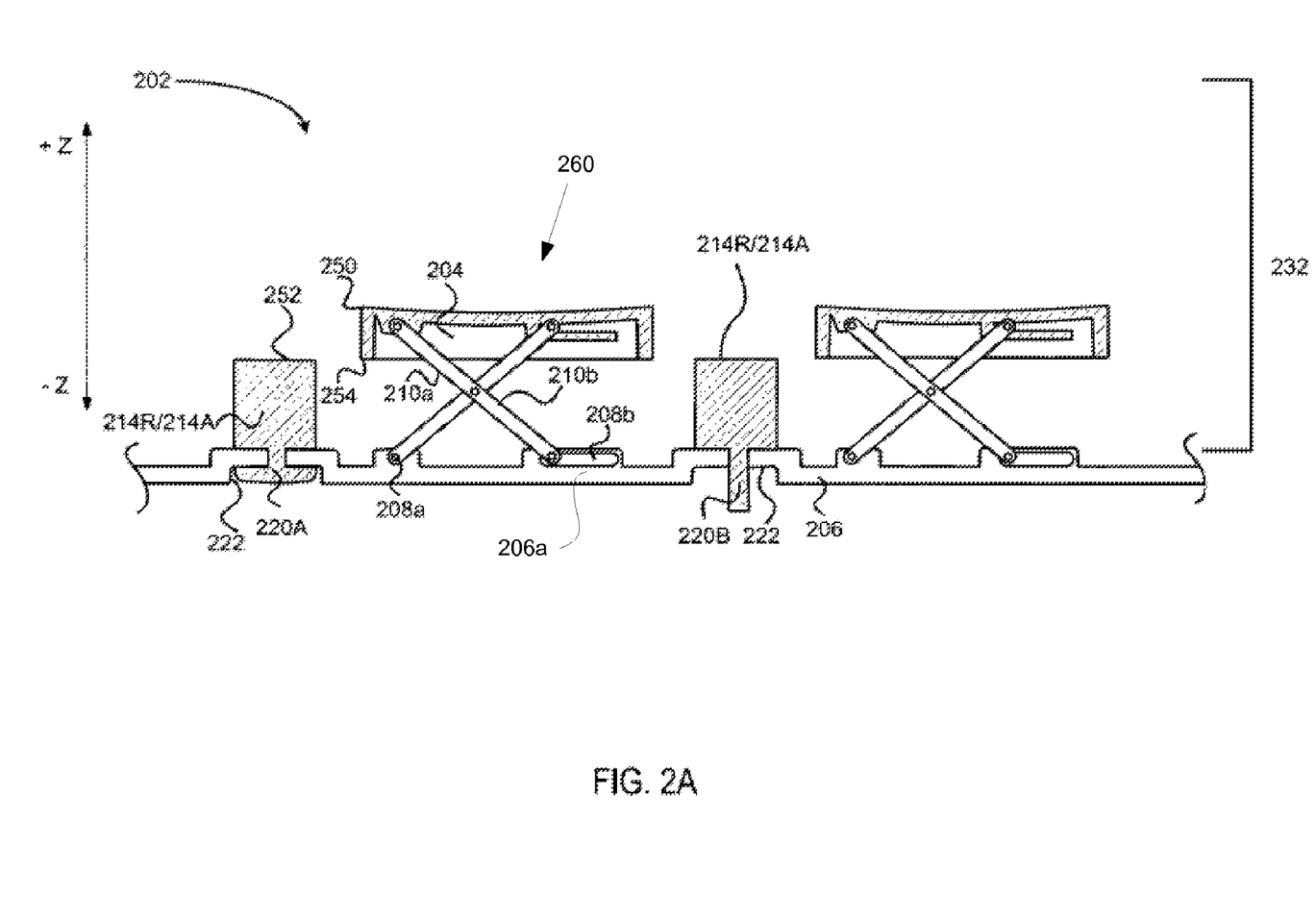
FIG. 2A shows, in accordance with an embodiment of the invention, a cut-away side view of the improved keyboard assembly.

The features and advantages of the present invention may be better understood with reference to the figures and discussions that follow. FIG. 2A shows, in accordance with an embodiment of the invention, a cut-away side view of a keyboard assembly 202. Keyboard assembly 202 typically includes a plurality of keycaps (such as the alphanumeric key caps typically found in a QWERTY keyboard or the numeric key caps found in a numeric keypad, for example). A representative key cap 204 is shown. Keyboard assembly 202 is typically employed in an electronic device, such as a computer. Because of the advantageous reduction in the thickness of the keyboard assemblies of embodiments of the present invention, keyboard assembly 202 and other keyboard embodiments discussed herein are also well suited for use in modern portable electronic devices, such as laptop computers, palmtop computers, or cell phones.

A mechanism plate 206 is disposed under the key caps. Mechanism plate 206 includes stamped or molded slot housings 208a and 208b for coupling with scissor linkages 210a and 210b. Scissor linkages 210a and 210b also couple with slots disposed on the underside of key cap 204 to support key cap 204 in its rest position as well as to facilitate movement in the +/-Z direction as key cap 204 is depressed and subsequently released by a human operator. There may exist other conventional structures such as the aforementioned rubber dome and electrical contacts. These conventional structures and variations thereof have been omitted from FIG. 2A to improve clarity.

Figure 2B:
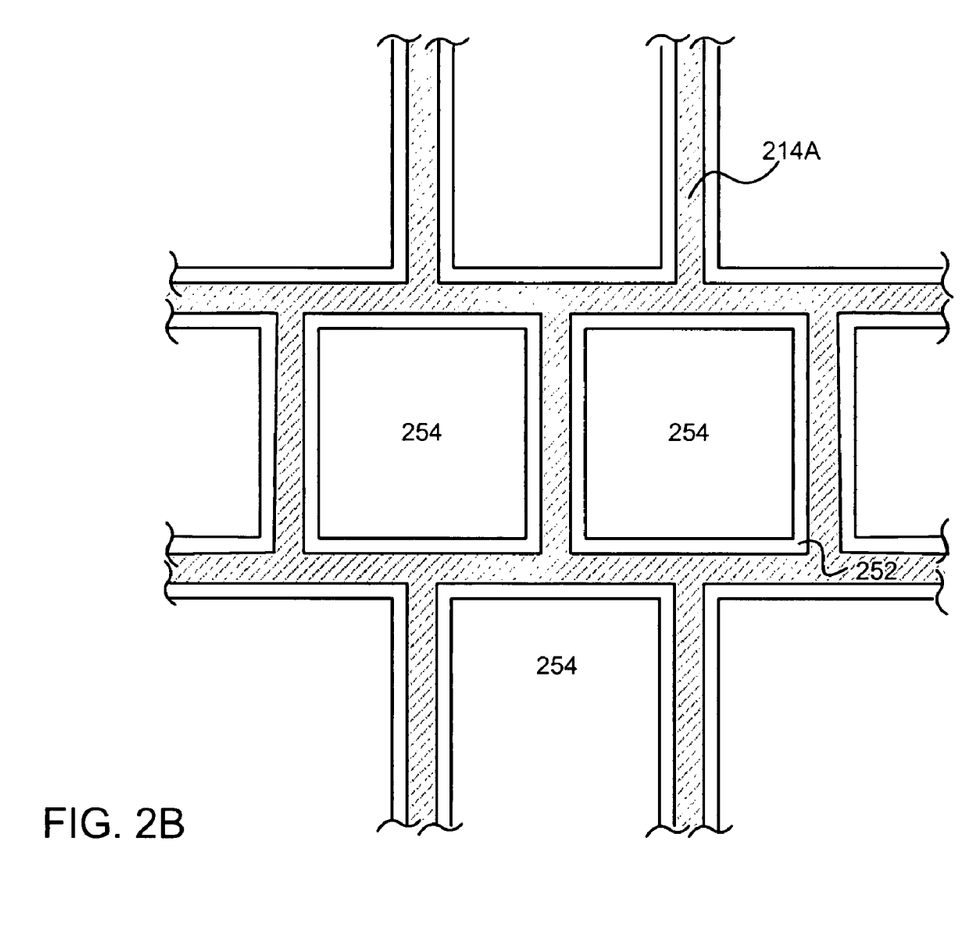
FIG. 2B shows, in accordance with an embodiment of the invention, a cut-away top view of the improved keyboard assembly.

A plurality of ribs 214R is shown in FIG. 2A. These ribs are interconnected to form a web-like structure 214A and are disposed in the interstitial spaces between adjacent key caps of the keyboard. One should understand from the reference number scheme that ribs 214R are rib-like parts of the web-like structure 214A; they are one and the same structure in an embodiment. As the term is employed herein, the web-like structure denote the structure that is formed by interconnected ribs. FIG. 2B shows, in accordance with an embodiment of the invention, a cut-away top view of a keyboard assembly 202. The interconnected ribs 214R define apertures 252 within which the key caps 254 may be disposed. The ribs are disposed such that they do not interfere with the up-and-down movement of the key caps within the apertures of the web-like structure.

In another embodiment shown in FIG. 2A, key cap assembly 260 can include key cap assembly support pad 206a that can independently provide support for key cap 204 and linkages 210a and 210b. As illustrated in FIG. 2B, key cap support pad 206a can be completely supported on all sides by ribs 214R as part of web-like structure 214A. In this way, web-like structure 214A can be used to secure key cap assembly support pad 206a to other key cap assembly support pads without using mechanism plate 206. For example, an embodiment of keyboard assembly 202 can be formed by attaching a plurality of key cap assemblies to web-like structure 214A by connecting the key cap assembly support pads associated with each of the plurality of key cap assemblies to ribs 214R. In this way, web-like structure 214A in combination with the key cap assembly support pads can provide support for keyboard assembly 202 without using mechanism plate 206.

In an embodiment, the web-like structure is formed of a plastic material and is coupled to mechanism plate 206 via a plurality of fasteners. In an embodiment, the web-like structure has integrally formed deformable posts 220A and 220B, which are configured to be inserted into holes formed in mechanism plate 206. After insertion, the ends of deformable posts are deformed (as may be seen with the left deformable post 220A of FIG. 2A) to secure the web-like structure to mechanism plate 206. For example, plastic deformable posts may be deformed using heat or ultrasonic energy or a similarly suitable method. In an embodiment, the ribs and the deformable posts are formed together as a single molded plastic part or stamped part. Alternatively or additionally, the web-like structure may be coupled to the mechanism plate using for example, swaging, riveting, or an appropriate adhesive. In an embodiment, the fasteners that fasten the web-like structure to the mechanism plate (e.g., the deformable posts) are distributed throughout the keyboard assembly (i.e., in addition to or instead of being distributed along the edge of the key cap area). By distributing the fasteners throughout the key cap area, a more rigid keyboard assembly is achieved.

Each individual key cap 204 may be dimensioned in the X-Y plane (i.e., the plane that is parallel to the top of the key caps) as appropriate. In an embodiment, key cap 204 may have a slightly reduced X-Y dimension to accommodate the addition of ribs 214R of the web-like structure. Key cap 204 and ribs 214R may be shaped in order to improve resistance to tampering and/or to contamination due to liquid spillage or the inadvertent introduction of dirt. This aspect will be discussed later herein.

By dispersing the web-like structure 214A in the interstitial spaces between adjacent key caps and by coupling the web-like structure 214A to mechanism plate 206 using a plurality of fasteners distributed throughout the key cap area, embodiments of the invention effectively increase the stiffness of the combined mechanism plate/web-like structure such that, in some cases, the stiffening function provided by the prior art keyboard base plate (such as keyboard base plate 104 of FIG. 1) is no longer necessary. In other cases, the keyboard base plate may be made thinner or may be formed from a less expensive material. Furthermore, web-like structure 214A is disposed in a vertical location in the Z-stack in such a manner that the presence of web-like structure 214A does not materially contribute to the increase in thickness of the Z-stack. This is because the web-like structure is disposed in the vertical space that is already allotted in the Z-stack to accommodate the up-and-down movement of key cap 204. By locating the ribs of the web-like structure in this vertical location (denote by reference number 232 in FIG. 2A), satisfactory keyboard assembly stiffness can be achieved with a reduced Z-stack thickness and/or without increasing the Z-stack thickness.

Further reduction in the Z-stack thickness can be realized by forming or stamping counter-sunk features 222 in mechanism plate 206. These counter-sunk features 222 contain the holes employed for fastening mechanism plate 206 to web-like structure 214A. The counter-sunk features allow the fasteners' heads (which may be the deformed portions of the aforementioned deformable posts) to be counter-sunk with respect to the lower surface of mechanism plate 206, thereby effectively reducing the protruding distance that the fasteners' heads would have protruded below the lower surface of mechanism plate 206. Such counter-sinking may be seen in FIG. 2A wherein the deformed head of deformable post 220A on the left side of the figure is counter-sunk with respect to the lower surface of mechanism plate 206. In this manner, no vertical space needs to be allotted for the height of the fasteners' heads, further reducing the Z-thickness of the resultant keyboard assembly.

In an embodiment, the web-like structure has interconnected ribs that define a plurality of apertures, with the key caps being disposed within the plurality of apertures such that when key caps transition between the rest position and the depressed position, a horizontal plane (seen in the perspective of FIG. 2A) that slices through the body of a key cap traverses a horizontal plane formed by the upper surface of the web-like structure. This is in contrast to the prior art, such as that shown in FIG. 1 wherein the key caps always remain above the keyboard mechanism plate and a plane that slices through the body of the key cap does not, in the prior art, traverses any other structure or the horizontal plane formed by the upper surface of the web-like structure (since there prior art does not even provide such a web-like structure).

Note that it is not necessary for the ribs to be present in between each pair of adjacent key caps of the keyboard. It is possible that sufficient stiffness and strength can be realized without having to provide ribs surrounding every key cap of the keyboard. It is also not necessary that the ribs completely surround each key cap or every key cap. As long as there is rib material present in the interstitial spaces among some key caps of the keyboard and in the vertical location that is allotted for key cap movement (but not in the horizontal location that interferes with key cap movement), some degree of stiffening is achieved without adding to the dimension of the Z-stack and/or with reduced Z-stack thickness.

Since the stiffness of a structure is approximately proportional to the cube of the effective thickness of the structure, thicker ribs (i.e., thick in the Z direction) tend to provide greater stiffness than thinner ribs (assuming the same modulus). Thick ribs are particularly suitable for keyboards that feature full-travel for the key caps. Furthermore, the presence of the ribs throughout the keyboard assembly renders it possible to provide a large number of fastening devices (such as the aforementioned posts) to more rigidly couple the web-like structure to the mechanism plate. In an embodiment, the post-to-post distance between adjacent posts may be 20 mm or less.

In an embodiment, the keyboard assembly is coupled to the rest of the device (e.g., laptop computer, keyboard housing, etc.) via the web-like structure. For example, in an embodiment, the web-like structure may be part of the device or fastened in advance to the device and the rest of the keyboard assembly (including the mechanism plate) may be mated with the web-like structure (and thereby coupled with the rest of the device) by fitting the rest of the keyboard assembly upward so that that the key caps are inserted upward into the apertures formed by interconnected ribs. After fitting, the mechanism plate may be fastened with the web-like structure (by, for example, deforming the heads of the aforementioned deformable posts. In another embodiment, the keyboard assembly is coupled to the rest of the device via the mechanism plate instead of via the web-like structure. In another embodiment, both the mechanism plate and the web-like structure is fastened with structures of the device.

From the mechanism plate plane, the distance to the upper surface of the ribs may vary relative to the distance to the lower surface of the key cap and the upper surface of the key cap. Furthermore, since a key cap may occupy two positions (i.e., at rest and depressed), there are multiple combinations possible. The particular combination chosen may reflect a particular tradeoff in the Z-stack thickness and ergonomics. In an embodiment, the bottom 254 of the key cap is substantially co-planar with the top surface 252 of the ribs in the at-rest position. This is seen in FIG. 3B. When the key cap is depressed, the top surface 250 of the key cap is substantially co-planar with the top surface 252 of the ribs (as seen in FIG. 3E).

Figure 3A:
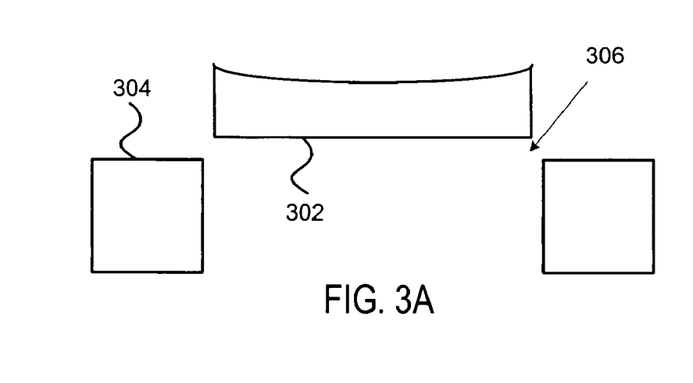
FIGS. 3A-3F show, in various embodiments of the invention, the relative positions of the key cap and the ribs.
Figure 3B:
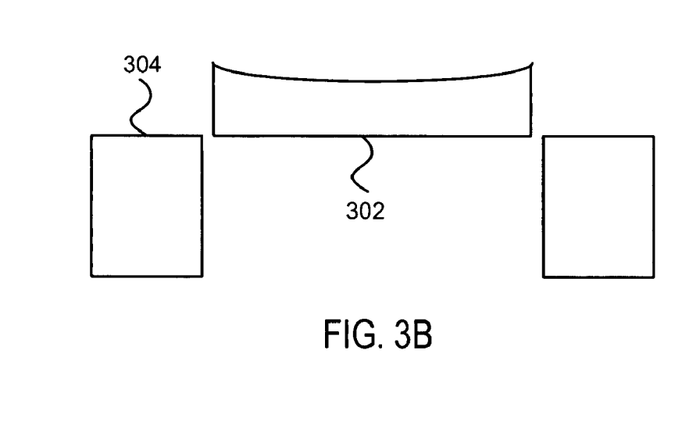
Figure 3C:
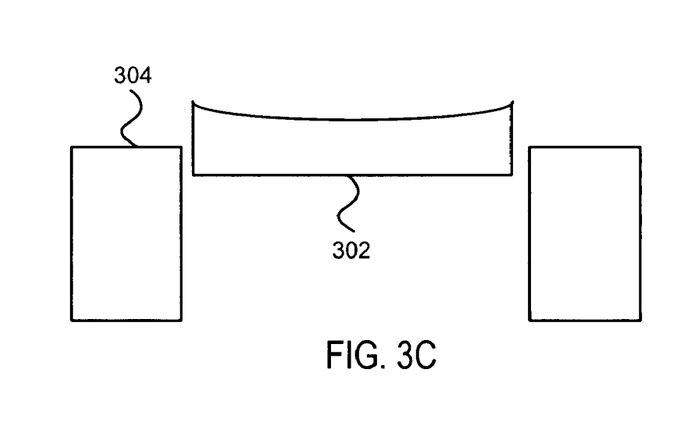

FIGS. 3A-3C show various possible positions of the key cap relative to the ribs when the key cap is at rest. In the embodiment of FIG. 3A, a small gap 306 may be provided between the top surface 304 of the ribs and the bottom surface 302 of the key cap when the key cap is in the at-rest position. By reducing the height or vertical thickness of the ribs, the embodiment of FIG. 3A may provide a slight reduction in the Z-stack thickness relative to the embodiment of FIG. 2A and/or provide more key travel distance. In the alternative embodiment of FIG. 3B, the top surface 304 of the ribs and the bottom surface 302 of the key cap may be substantially co-planar when the key cap is in the at-rest position. In the alternative embodiment of FIG. 3C, the top surface 304 of the ribs is higher than the bottom surface 302 of the key cap when the key cap is in the at-rest position. The embodiment of FIG. 3C offers improved reliability since there is no gap between the bottom of the key cap and the top surface of the ribs. To some users, the embodiment of FIG. 3C appears aesthetically pleasing.

Figure 3D:
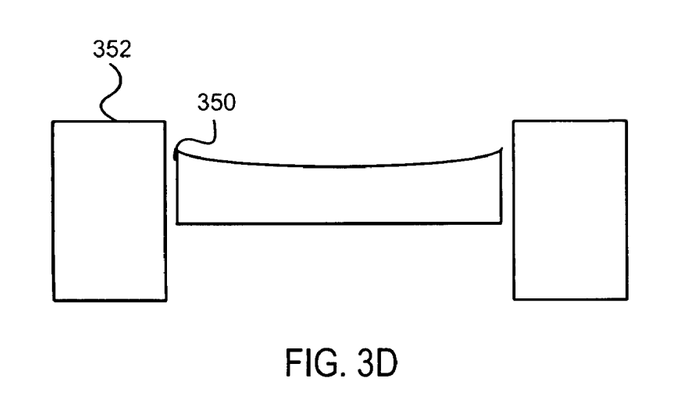
Figure 3E:
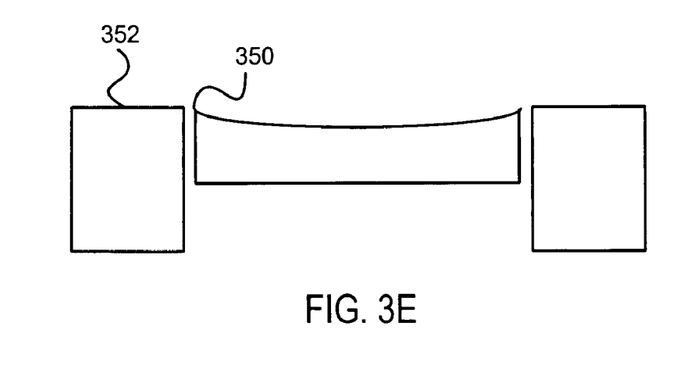
Figure 3F:
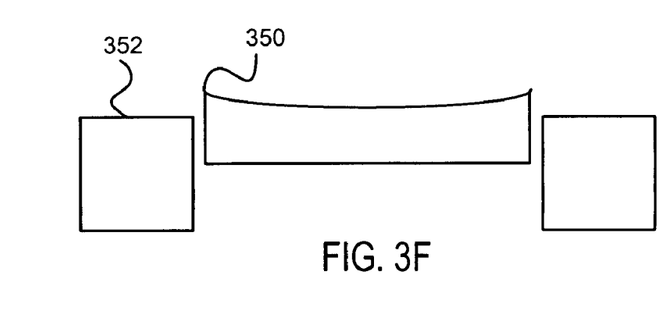

FIGS. 3D-3F show various possible positions of the key cap relative to the ribs when the key cap is depressed. In the embodiment of FIG. 3D, the top surface 352 of the rib is higher than the top surface 352 of the key cap when the key cap is depressed. Relative to the embodiments of FIGS. 3E and 3F, the embodiment of FIG. 3D offers reduced Z-stack thickness for a given key travel distance. In the embodiment of FIG. 3E, the top surface 352 of the rib is higher than the top surface 352 of the key cap. In the embodiment of FIG. 3E, the top surface 352 of the rib is substantially co-planar with the top surface 352 of the key cap when the key cap is depressed. In the embodiment of FIG. 3F, the top surface 352 of the rib is higher than the top surface 352 of the key cap when the key cap is depressed. To some users, the embodiment of FIG. 3F offers a pleasing tactile experience since the user's finger does not touch the surrounding ribs when the key cap is depressed. Note that FIG. 2, and FIGS. 3A-3F show only some example combinations; other combinations are possible. In all these embodiments, stiffness is provided by the interconnected ribs of the web-like structure that are disposed above and connected to the mechanism plate.

Figure 4:
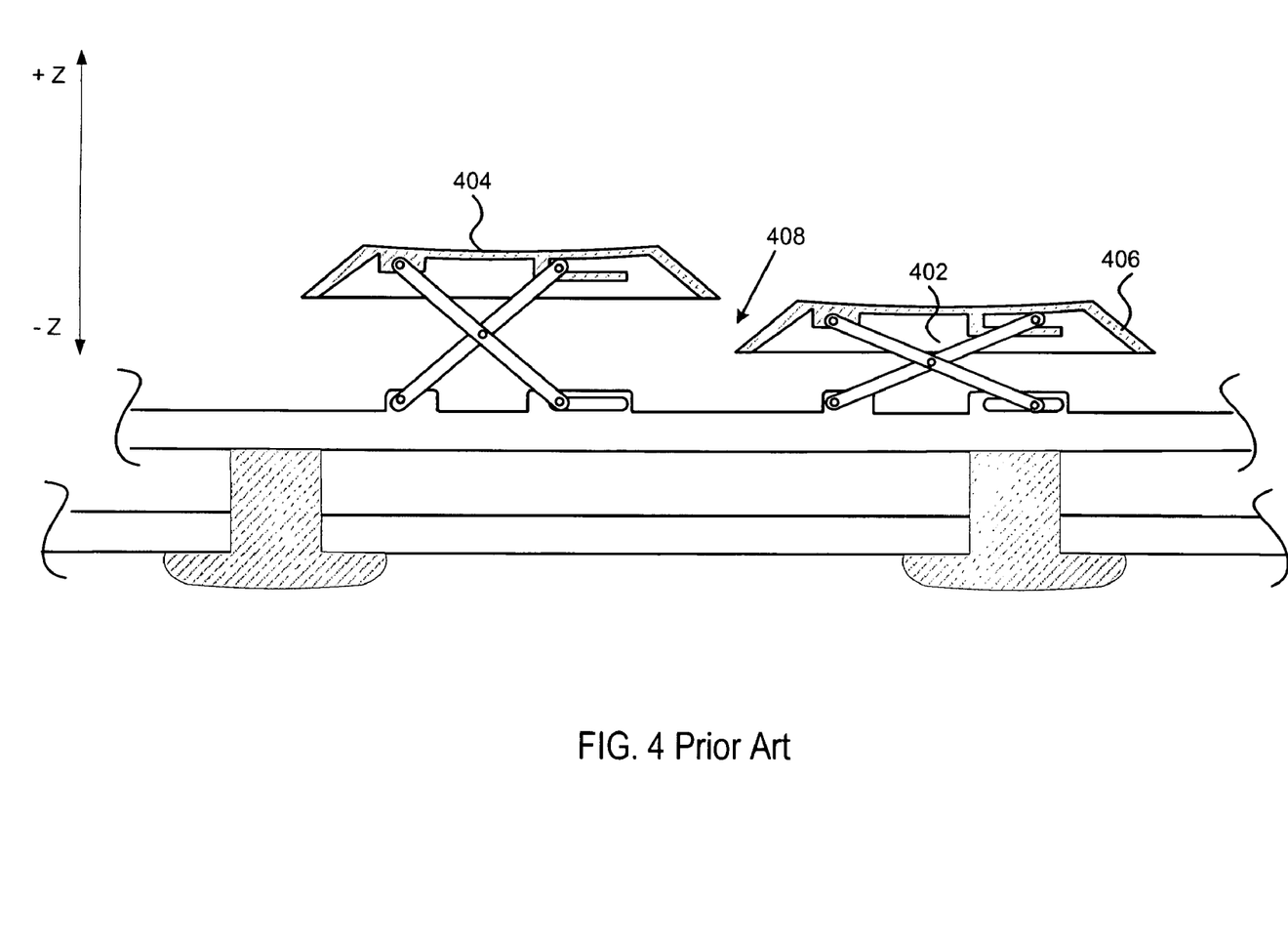
FIG. 4 is a prior art figure showing the relative positions of adjacent key caps.

Some users, such as small children or adults with small hands and/or long fingernails, may find that their fingers occasionally slide off the depressed key and may become caught in the area 408 between the depressed key 402 and the adjacent key 404 of FIG. 4. A caught finger may dislodge an adjacent key cap when the finger is pulled upward, which leads to a high defect rate in the field. Embodiments of the invention include features to address the above-discussed problems with the prior art.

Figure 5:
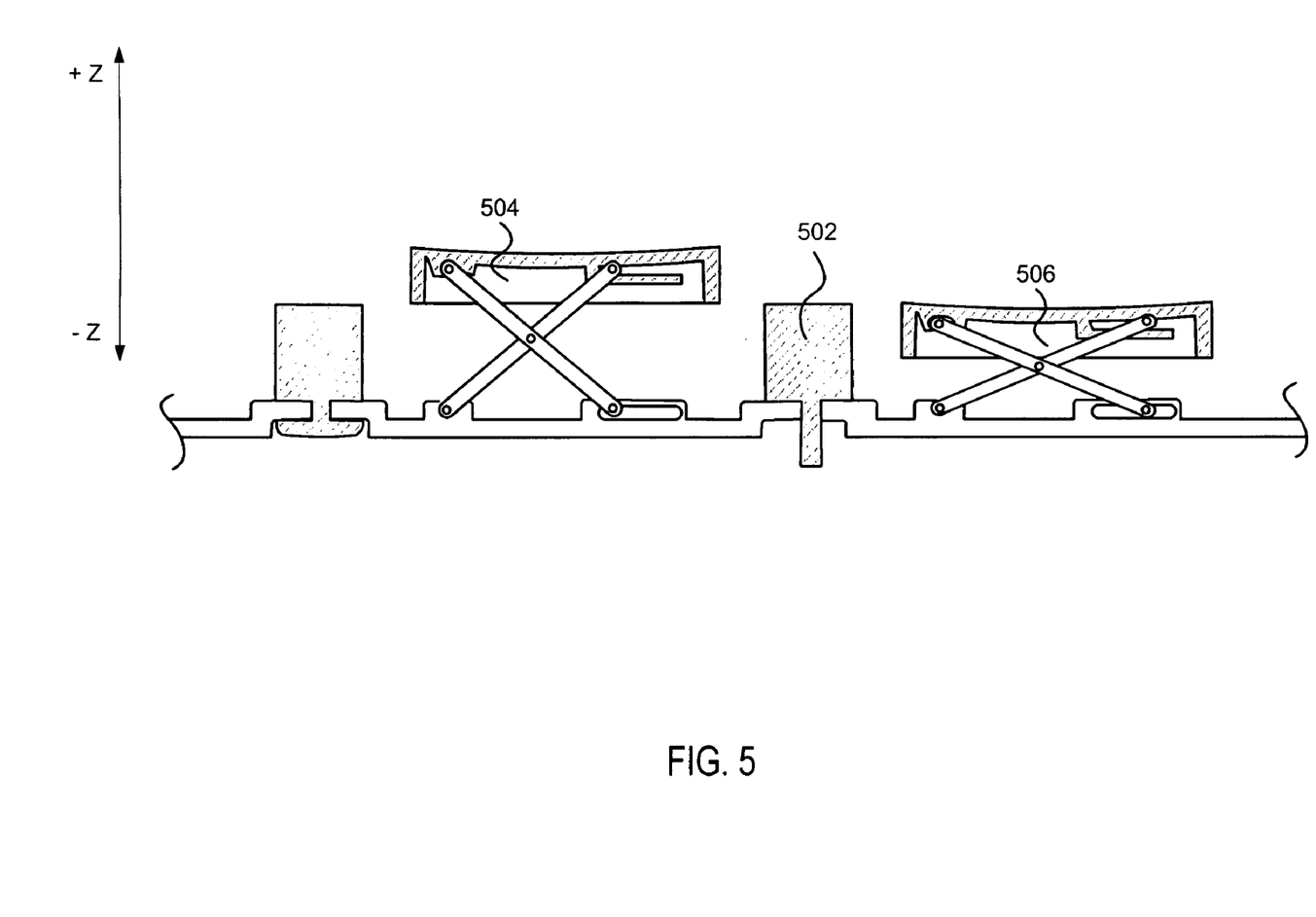
FIG. 5 illustrates, in accordance with an embodiment of the invention, the relative positions of adjacent key caps and ribs.

In the embodiment of FIG. 5, the presence of a static rib structure 502 in between adjacent key caps 504 and 506 renders it more difficult for a finger to slide off a depressed key 506 and to become trapped under an adjacent key cap 504. This feature tends to reduce the incidence of dislodged key caps in the field, and renders the keyboard more comfortable to operate for young children and adults with small hands and/or long fingernails.

In the prior art, the top side of a key cap is tapered to prevent an adjacent key cap from being inadvertently depressed when the user's finger is pressing on a given key cap. Since the user's fingers do not contact the center of each key cap every time, tapering the key cap's top side is an effective way of reducing the incidence of inadvertent keystroke activation when adjacent key caps are located next to one another without any structure interposed in between. With reference to FIG. 4, there are shown two adjacent keys 402 and 404, with the tapering slope of key 402 being denoted with reference number 406.

Tapering the top side of the key cap, however, introduces other issues. For one, the tapered slope channels foreign materials (such as dirt or water) to the electrically sensitive and difficult-to-clean underside area of the key caps where they tend to remain trapped. With the presence of the ribs in between adjacent keys, embodiments of the invention render it possible to shape the key caps and/or the ribs to enable the keyboard to have a greater resistance to dirt and liquid spillage and/or resistance to tampering by mischievous users. Thus, the benefit provided by this embodiment includes not only reduced thickness but also anti-tampering and/or spill resistance. As such, embodiments of the invention are beneficial not only where a reduced keyboard assembly thickness is desired but also where a ruggedized keyboard is desired.

Figure 6:
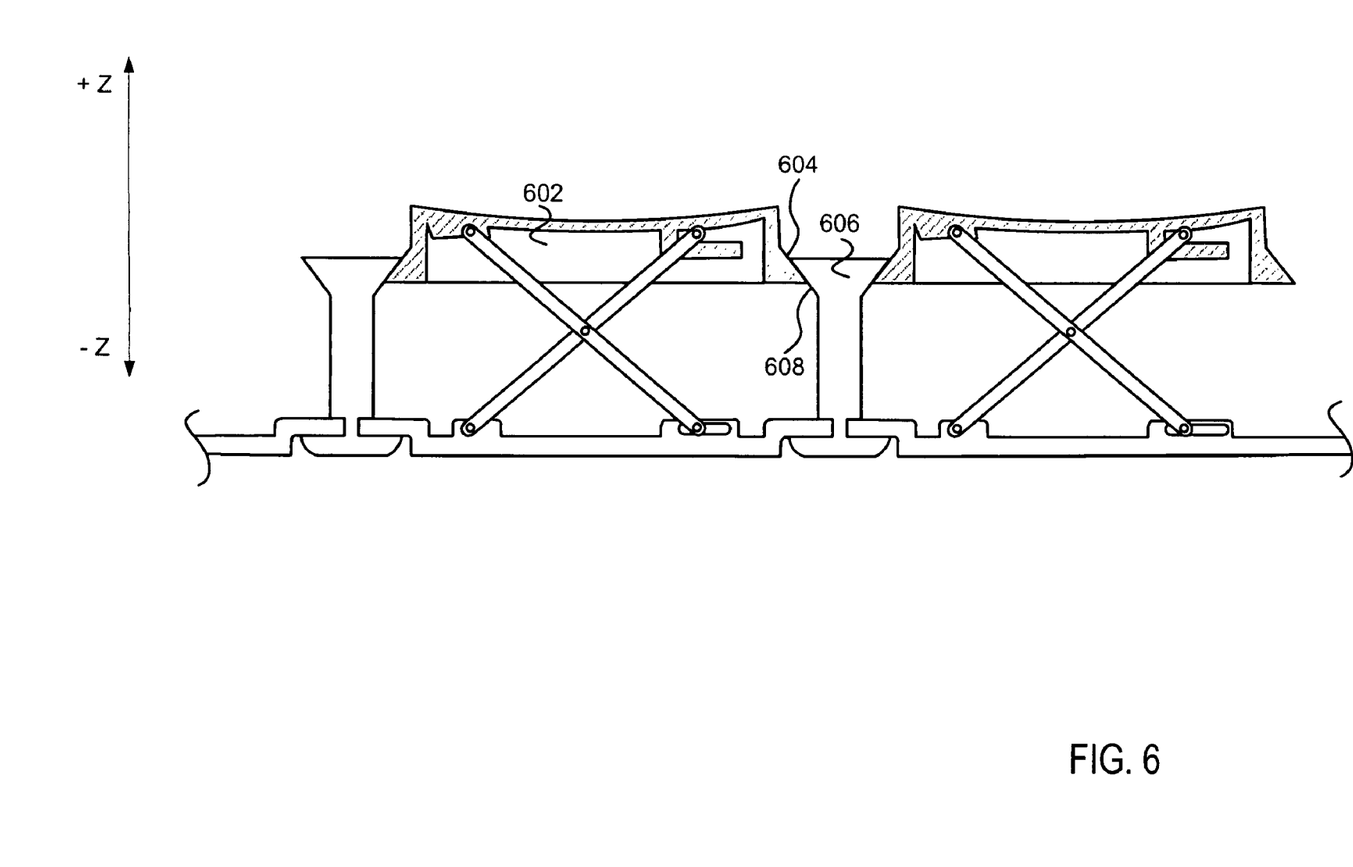
FIG. 6 illustrates, in accordance with an embodiment, the taper flange feature of the key caps and the ribs.

With reference to FIG. 6, key cap 602 has a taper flange 604 at its base (which may exist as an alternative to or as an addition to the tapering of the top side of the key cap). Rib 606 also has a taper flange 608 that is configured to mate with flange 604 when the key cap is in the at-rest position.

The mating of flanges 604 and 608 effective closes the gap between a key cap and its adjacent ribs, thereby preventing dirt, liquid, and/or other contaminants from falling into the region between the key cap and the adjacent ribs. Furthermore, the shape of the respective flanges effectively "traps" key cap 602 under the flanges of the adjacent ribs, thereby preventing a mischievous user from being able to tamper with and/or remove key cap 602 by pulling or prying key cap 602 upward.

The mating of the taper flanges also provides a "self-centering" action for the key cap as the key cap is released from its depressed position. This self-centering feature advantageously imparts a more precise look-and-feel to the keyboard. Furthermore, the self-centering feature, alone or in combination with the ability to hold the key cap captive under the flanges of the adjacent ribs, provides an opportunity to substantially simplify the biasing arrangement that is employed to return the key to the at-rest position. For example, a simple spring or a resilient structure may be employed to return the key cap to its at rest position without having to employ the more complicated and fragile scissor linkages.

Figure 7A:
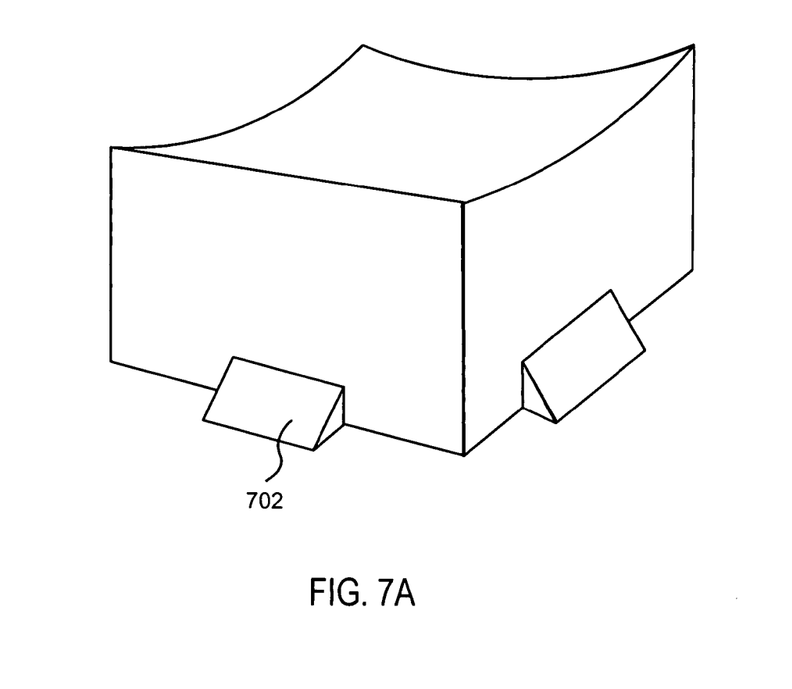
FIGS. 7A and 7B show embodiments wherein only partial flanges are provided.

In some embodiments, flange 604 does not have to encircle all the way around, or surround, the base of key cap 602. FIG. 7A shows an embodiment wherein only partial taper flanges 702 are provided. The embodiment of FIG. 7A is not as resistant to, for example, liquid spillage as the embodiment of FIG. 6; however the anti-tampering benefit remains.

Figure 7B:
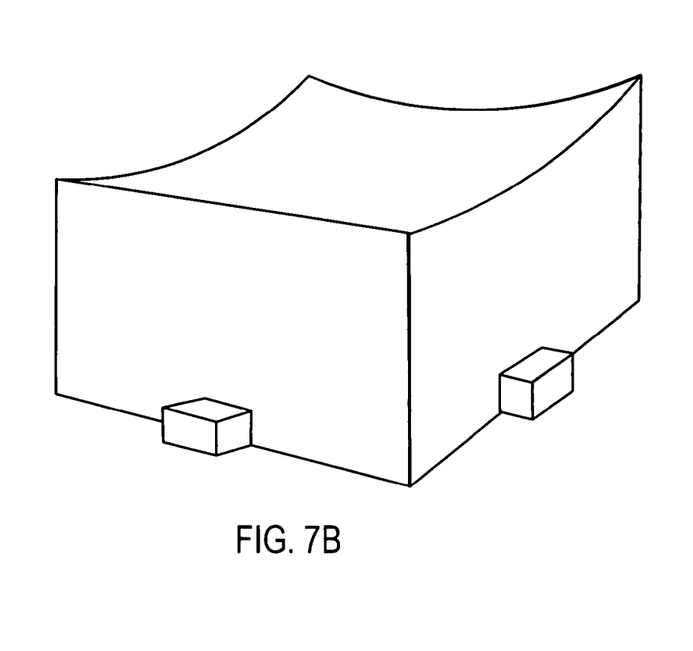
Figure 8:
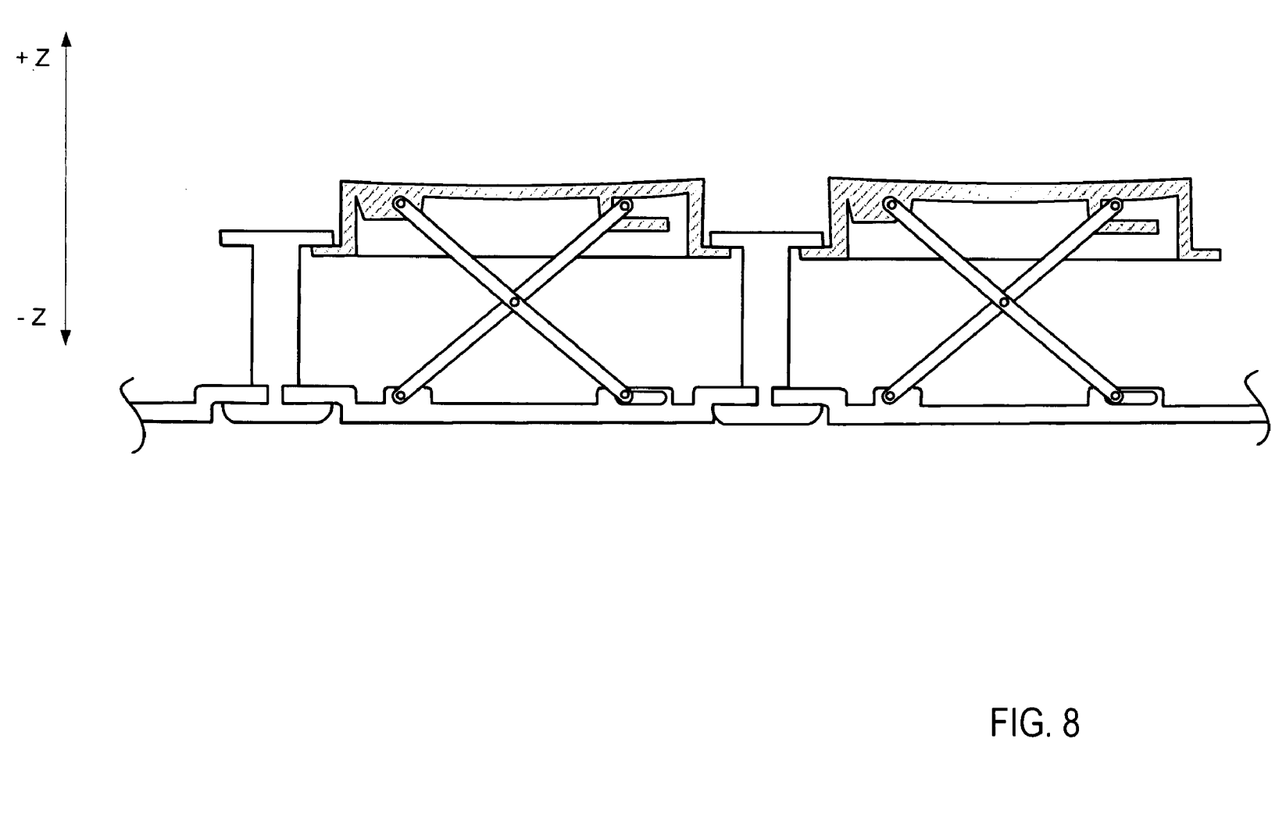
FIG. 8 illustrates, in accordance with an embodiment, the "top hat" feature of the key caps and the ribs.

FIG. 8 shows an alternate embodiment wherein the flange is not tapered (as was done in FIG. 6). In this "top hat" embodiment, the flanges of the base of the key cap and of the adjacent ribs form a lip-and-shoulder mating configuration. Resistance to contaminants and to tampering are offered by the embodiment of FIG. 8 while the key caps are at rest. As an alternative, the flanges of the base of the key cap and/or of the adjacent ribs may be partial flanges instead of full flanges. FIG. 7B shows an embodiment wherein only partial "top hat" flanges are provided. In such an embodiment, the resistance to tampering is maintained.

While the invention has been described in terms of several preferred embodiments, there are alterations, permutations, and equivalents which fall within the scope of this invention. For example, features from various embodiments discussed herein may be combined in any suitable combination as desired. It is therefore intended that the following appended claims be interpreted as including all such alterations, permutations, and equivalents as fall within the true spirit and scope of the invention.

What is claimed is:

1. A keyboard assembly configured for converting keystroke activation into electrical signals, the keyboard assembly comprising:
   a plurality of individual key cap assemblies, each individual key cap assembly comprising:
      a key cap configured to transition between a rest position and depressed position,
      an associated key cap support pad located directly below and physically separate from the key cap and arranged to provide mechanical support only for the associated key cap located directly thereabove, and
      a linkage unit that mechanically couples the key cap and the key cap support pad, the linkage unit facilitating the transitioning of the key cap between the rest and depressed positions; and
   a keyboard support lattice comprising:
      a plurality of interconnected horizontal and vertical ribs that intersect to form a plurality of apertures at least one of which has a shape and size in accordance with the key cap, wherein the horizontal and vertical ribs fit interstitially between at least some of the plurality of individual key cap assemblies, wherein the interconnected horizontal and vertical ribs connect together and support at least some of the plurality of key cap support pads such that the associated plurality of key cap assemblies are supported by and are physically separated from each other only by the keyboard support lattice.

2. The keyboard assembly as recited in claim 1, wherein the vertical and horizontal ribs are formed of a plastic material allowing the keyboard assembly to flex and bend.

3. The keyboard assembly as recited in claim 1, wherein during assembly the key cap is inserted upwards into the aperture.

4. The keyboard assembly as recited in claim 1, wherein the plurality of key cap assemblies includes a first key cap assembly having a first key cap having a top hot configuration that includes flanges configured to mate with shoulders formed by ribs of the interconnected ribs when the first key cap assembly is in the rest position.

5. The keyboard assembly as recited in claim 4 wherein the flanges completely surrounds a base of the first key cap.

6. The keyboard assembly as recited in claim 4 wherein the flanges partially surround a base of the first key cap.

7. The keyboard assembly as recited in claim 1 wherein the plurality of key cap assemblies includes a first key cap, the first key cap having taper flanges configures to mate with taper shoulders formed by ribs of the interconnected ribs with at least a contact surface of the taper flanges attached to at least a contact surface of the taper shoulders when the first key cap is in the rest position, the contact surface of the taper flanges being parallel to the contact surface of the taper shoulder for biasing the first key cap toward a center position of the first key cap.

8. The keyboard assembly as recited in claim 7, wherein the taper flanges completely surround a base of the first key cap.

9. The keyboard assembly as recited in claim 8 wherein the taper flanges partially surround a base of the first key cap.

10. The keyboard assembly as recited in claim 1 wherein the top surface of the portion of the plurality of interconnected ribs is lower than a bottom surface of the at least some key caps of the plurality of key caps when the at least some key caps of the plurality of key caps are in the rest position.

11. The keyboard assembly as recited in claim 1 wherein a bottom surface of at least some key caps of the plurality of key caps is higher than or co-planar with the top surface of the portion of the plurality of interconnected ribs when the at least some key caps of the plurality of key caps are in the rest position.

12. The keyboard assembly as recited in claim 1 wherein a bottom surface of the at least some key caps of the plurality of key caps is higher than the top surface of the portion of the plurality of interconnected ribs when the at least some key caps of the plurality of key caps are in the rest position.

13. A method of forming a flexible keyboard, comprising:
receiving a plurality of individual key cap assemblies, each individual key cap assembly comprising: a key cap configured to transition between a rest position and depressed position, an associated key cap support pad located directly below and physically separate from the key cap and arranged to provide mechanical support only for the associated key cap located directly thereabove, and a linkage unit that mechanically couples the key cap and the key cap support pad, the linkage unit facilitating the transitioning of the key cap between the rest and depressed positions;
receiving a keyboard support lattice, the keyboard support lattice comprising: a plurality of interconnected horizontal and vertical ribs at least some of which intersect to form a plurality of apertures at least one of which has a shape and size in accordance with the key cap, wherein the horizontal and vertical ribs fit interstitially between at least some of the plurality of individual key cap assemblies;
inserting the key cap upwards into the aperture
attaching the key cap support pad of the at least one individual key cap assembly to the intersecting horizontal and vertical ribs that form the aperture wherein only those intersecting vertical and horizontal ribs that form the aperture connect and support the key cap support pad; and
repeating the inserting and attaching until those of the plurality of individual key cap assemblies comprising the flexible keyboard are attached to the keyboard support lattice and are supported by and physically separated from each other only by the keyboard support lattice.

14. The method as recited in claim 13, wherein the web-like structure is formed of a plastic material allowing the flexible keyboard to flex and bend.

15. The method as recited in claim 13, wherein the key cap support pad includes at least a plurality of counter-sunk features, a first plurality of portions of the plurality of interconnected ribs being disposed inside the plurality of counter-sunk features.

16. The method as recited in claim 13, wherein the first plurality of portions of the plurality of interconnected ribs are counter-sunk with respect to a lower surface of the key cap support pad without protruding from a lower surface of the key cap support pad.

\* \* \* \* \*

UNITED STATES PATENT AND TRADEMARK OFFICE
CERTIFICATE OF CORRECTION

| | | |
|---|---|---|
| PATENT NO. | : 7,850,378 B1 | Page 1 of 1 |
| APPLICATION NO. | : 11/129252 | |
| DATED | : December 14, 2010 | |
| INVENTOR(S) | : Chris Ligtenberg et al. | |

It is certified that error appears in the above-identified patent and that said Letters Patent is hereby corrected as shown below:

In column 10, line 23, in claim 13, after "aperture" insert -- ; --.

Signed and Sealed this
Eighteenth Day of October, 2011

David J. Kappos
*Director of the United States Patent and Trademark Office*